UNITED STATES PATENT OFFICE 2,269,138

ANTIFREEZE COMPOSITION

Lionel Bernard, Camden, N. J.

No Drawing. Application February 26, 1940,
Serial No. 320,975

2 Claims. (Cl. 252—72)

This invention relates to an antifreeze composition, and more particularly to a non-corrosive, non-inflammable fluid having a low freezing point and being especially useful in cooling systems or the like.

Many substances have been suggested heretofore for use in antifreeze compositions, and while some of them have been found more or less satisfactory depending upon the particular use to which they have been put, most of them are objectionable for one reason or another. Among the more common substances which have been proposed heretofore are solutions containing alcohol, glycerine, glycols, and mixtures of these substances, as well as solutions of certain metallic chlorides. The alcohols are combustible and readily evaporate; glycerine and glycols are also combustible and are quite expensive; and all these substances are corrosive and creep. To prevent corrosion, various inhibitors have been suggested, but none of these inhibitors has successfully prevented creeping, so far as I am aware, nor have they eliminated the combustibility of these substances.

The primary object of my invention is to provide a novel antifreeze composition which will be entirely free from the aforementioned and other similar defects which characterize the antifreeze compositions of the prior art.

More particularly, it is an object of my invention to provide a novel antifreeze composition which has a low freezing point, which is not combustible, which will not corrode metals with which it may come in contact, and which will not creep.

Another object of my invention is to provide a novel antifreeze composition which has wide working range between its freezing and boiling points and which is very stable within said range.

Still another object of my invention is to provide a novel antifreeze composition which does not volatilize easily, which has no offensive odor, which does not attack paints or other materials used for coating automobile bodies or the like, and which does not attack rubber, fabrics, or the like.

A further object of my invention is to provide a novel antifreeze composition which is readily soluble in all proportions of water and alcohol.

Still a further object of my invention is to provide a novel antifreeze composition which will not thicken or sludge out on cooling, nor will it boil off or evaporate at normal temperatures.

It is also an object of my invention to provide a novel antifreeze composition which is very inexpensive in cost, which is easy to produce, and which is both economical and highly efficient in use.

According to my invention, I provide an aqueous solution of a halide of magnesium and a phosphate of ammonium, and add thereto an inhibiting agent consisting of one or more extracts from certain trees or plants and a moss. These ingredients are all readily soluble in water, and when mixed in the correct proportions, they not only provide a solution which has all the advantages noted above, but also provide a very stable composition which may be stored away with safety for considerable periods. I have found that this composition will not jell even when subjected to temperatures as low as −60° F., nor will it evaporate appreciably under 200° F., its boiling point being above that of water and in the neighborhood of 220° F. The inhibiting agent which I employ prevents corrosion of all known metals and alloys, such as aluminum, brass, bronze, steel, cast iron, alloy steels, etc., and the composition is not harmful to automobile finishes, paints, rubber or fabric, whether hot or cold. Since it contains no poisonous metals or other materials and is not combustible, it is entirely safe to use. Moreover, inasmuch as it is soluble in both water and alcohol in all proportions, it may readily be diluted with these solvents, if desired, and in any case, it does not give off any odors which are offensive. Also of interest is the fact that my novel composition has an expansion, when heated, which is similar to that of water.

The novel features that I consider characteristic of my invention are set forth with particularity in the appended claims. The invention itself, however, both as to its composition and manner of production, together with additional objects and advantages thereof, will best be understood from the following description of one embodiment thereof:

Ordinarily, alkali phosphates precipitate insoluble magnesium phosphate from solutions of magnesium salts, but in accordance with my invention, I use an excess of magnesium chloride and thereby prevent the magnesium phosphate from precipitating out.

To make up one gallon of my novel antifreeze solution, I heat four pints and one and one-half ounces of water to a temperature of 110° F. and dissolve therein four pounds and thirteen ounces of magnesium chloride, preferably in crystal form. In another vessel I heat one pint of water to a temperature of 110° F. and dissolve therein four ounces of ammonium biphosphate (the monobasic form being preferred). The ammonium biphosphate solution is added slowly to the magnesium chloride solution while stirring constantly.

In a separate container, I then prepare the inhibitor by heating to 110° F. 6.90 cc. of water and dissolve therein, by cooking at this temperature, 0.9 gram of *Acacia catechu*, 0.036 gram of *Ourouparia gambir*, 0.021 gram of Chondrus, and 0.245 gram of *Tsuga canadensis*. When this has been thoroughly cooked and dissolved, I add this solution to the one prepared as above.

A composition made up as above is particularly useful in the cooling systems of internal combustion engines, but its use is by no means limited thereto, since it may also be used with great advantage in milk and cream cooling units, brewery cooling units, in the bottling of aerated water and other bottled liquids, as a seal for gas tanks where the fluid is exposed to relatively low temperatures, as a protective fluid in sprinkler systems, and in general as a protective fluid against freezing, as well as in home and industrial heating systems. By using an excess quantity of magnesium chloride, as indicated above, creeping of the solution is eliminated, and for this reason, when my novel composition is used in the cooling system of an internal combustion engine, should any of the liquid composition leak out onto the engine block, the heat thereof will dry it out and leave a dry, insoluble phosphate which will no longer pick up water and creep or "weep."

From the foregoing description, it will be apparent to those skilled in the art that I have provided a novel antifreeze composition which has many advantages over those heretofore available, and although I have described but one embodiment thereof, I am fully aware that many other embodiments are possible. Thus, it is not to be assumed that the specific proportions set forth for the various ingredients are limiting, since they were cited merely by way of example. Moreover, a number of other substances may be used in place of those specifically set forth. I desire, therefore, that my invention shall not be limited except insofar as is made necessary by the spirit of the appended claims.

I claim as my invention:

1. An antifreeze composition of matter comprising an aqueous solution of magnesium chloride and ammonium biphosphate in approximately the following proportions: water, 5 pints and 1½ ounces; magnesium chloride, 4 pounds and 13 ounces; and ammonium biphosphate, 4 ounces, and an inhibiting agent for inhibiting corrosion of metals with which said composition comes in contact, said inhibiting agent comprising a mixture of *Acacia catechu*, *Ourouparia gambir*, Chondrus and *Tsuga canadensis* in substantially the following proportions per gallon of solution:

| | Gram |
|---|---|
| *Acacia catechu* | 0.9 |
| *Ourouparia gambir* | 0.036 |
| Chondrus | 0.021 |
| *Tsuga canadensis* | 0.245 |

2. An antifreeze composition of matter comprising an aqueous solution of magnesium chloride and a phosphate of ammonia, the quantity of magnesium chloride present being in excess of that with which the quantity of ammonium phosphate present would normally react to yield precipitated magnesium phosphate, and small proportions of an inhibitor mixture comprising *Acacia catechu*, *Ourouparia gambir*, Chondrus and *Tsuga canadensis*.

LIONEL BERNARD.